(12) United States Patent
Ooba

(10) Patent No.: US 8,810,710 B2
(45) Date of Patent: Aug. 19, 2014

(54) IMAGING USING NORMALIZED LUMINANCE VALUE TO DISPLAY FOCUS STATE

(75) Inventor: Yuuji Ooba, Kanagawa (JP)

(73) Assignee: Sony Corporation, Tokyo (JP)

( * ) Notice: Subject to any disclaimer, the term of this patent is extended or adjusted under 35 U.S.C. 154(b) by 87 days.

(21) Appl. No.: 13/468,238

(22) Filed: May 10, 2012

(65) Prior Publication Data

US 2012/0293689 A1 Nov. 22, 2012

(30) Foreign Application Priority Data

May 18, 2011 (JP) ................................ 2011-111433

(51) Int. Cl.
*H04N 5/222* (2006.01)
*H04N 9/68* (2006.01)
*G03B 3/00* (2006.01)
*G03B 13/00* (2006.01)
*G03B 17/18* (2006.01)

(52) U.S. Cl.
USPC .................. 348/333.02; 348/234; 348/333.04; 348/333.11; 348/345; 348/346; 348/349; 396/89; 396/201; 396/202; 396/204; 382/255

(58) Field of Classification Search
USPC ........................ 348/234–238, 333.01–333.12, 348/345–356; 396/89, 201, 202, 204; 382/255
See application file for complete search history.

(56) References Cited

U.S. PATENT DOCUMENTS

| 2004/0036792 A1* | 2/2004 | Moriya et al. ................. 348/345 |
| 2006/0146174 A1* | 7/2006 | Hagino ......................... 348/349 |
| 2008/0074531 A1* | 3/2008 | Ide et al. ....................... 348/346 |
| 2008/0278592 A1* | 11/2008 | Kuno et al. ................. 348/222.1 |
| 2011/0075018 A1* | 3/2011 | Kohama ....................... 348/348 |

FOREIGN PATENT DOCUMENTS

JP 2010-135865 6/2010

* cited by examiner

*Primary Examiner* — Michael Osinski
*Assistant Examiner* — Quan Pham
(74) *Attorney, Agent, or Firm* — Frommer Lawrence & Haug LLP; William S. Frommer

(57) ABSTRACT

Provided is an imaging apparatus including an imaging unit that performs imaging with an image sensor having pixels of first, second, and third colors, a luminance ratio calculation unit that integrates luminance of each of the first, second, and third colors within a focus determination region of an imaging signal output by the imaging unit and calculates a ratio of the luminance between the integrated values of the colors, a luminance normalization unit that normalizes the integrated value of the luminance of the first color within the focus determination region of the imaging signal output by the imaging unit at the ratio of the luminance between the integrated values calculated by the luminance ratio calculation unit, and a display processing unit that performs display corresponding to the integrated value of the luminance normalized by the luminance normalization unit.

6 Claims, 5 Drawing Sheets

DISPLAY EXAMPLES

FIG.2
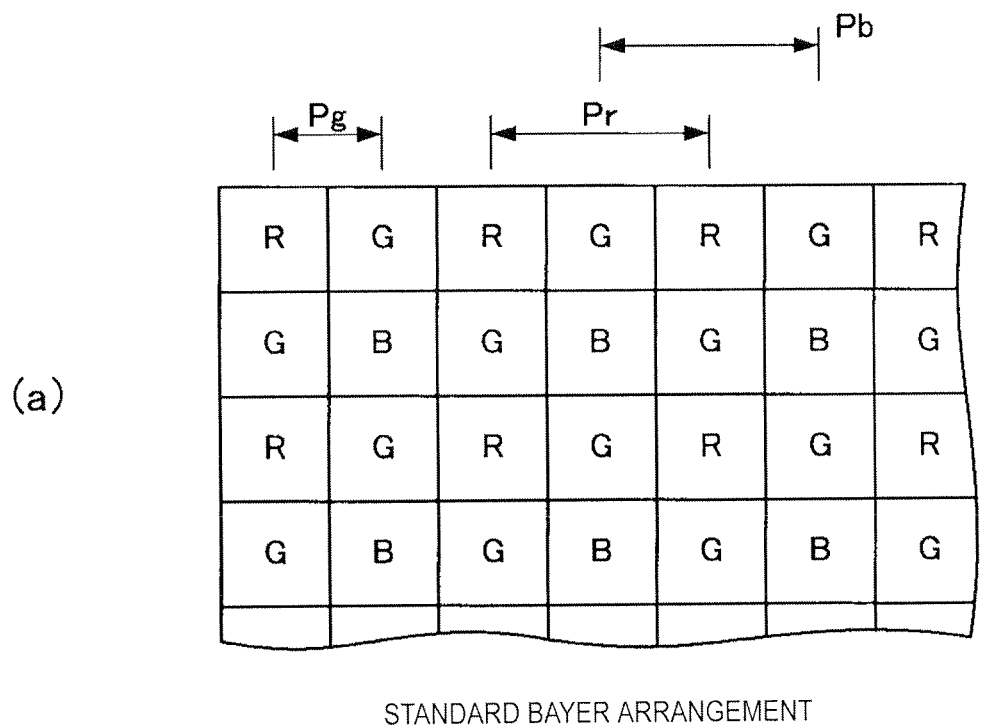
(a) STANDARD BAYER ARRANGEMENT
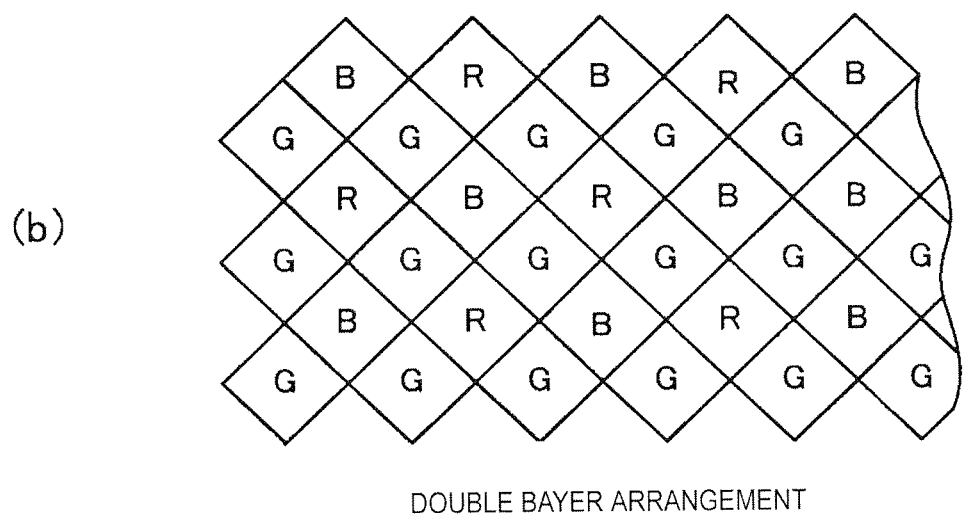
(b) DOUBLE BAYER ARRANGEMENT

EXAMPLES OF LEVELS OF COLOR COMPONENTS

DISPLAY EXAMPLES

IMAGING USING NORMALIZED LUMINANCE VALUE TO DISPLAY FOCUS STATE

BACKGROUND

The present disclosure relates to an imaging apparatus and an imaging method, and more particularly, to a focus adjustment technology when imaging is performed.

In imaging apparatuses (video cameras) for broadcast or business use, focus adjustment is frequently performed by a manual focus operation on which the intention of a photographer is reflected. Some of the imaging apparatuses performing the manual focus operation display assistance for the focus adjustment on a viewfinder so that a photographer can easily operate the focus. For example, the imaging apparatuses perform processes of extracting the high-frequency component from a luminance signal of a video signal, generating an edge enhancement signal, and adding the edge enhancement signal to this luminance signal. Thus, when the enhanced edge in a captured image is displayed on the viewfinder, the photographer can easily confirm a focus adjustment state of the edge portion on the viewfinder.

Further, when a focus adjustment state of an image captured by an imaging apparatus is displayed quantitatively with a numerical value, a graph, or the like on a viewfinder, a photographer can conveniently confirm a focus state when manually adjusting the focus. When the focus adjustment state is displayed with a numerical value or the like, for example, the high-frequency component of a luminance signal of an image obtained by imaging is detected and the detected level is displayed.

Japanese Unexamined Patent Application Publication No. 2010-135865 discloses a technology of displaying an image enhanced in the edge portion on a viewfinder.

SUMMARY

In recent years, single plate type image sensors of imaging apparatuses have been developed in which a color arrangement of pixels is a special arrangement such as a Bayer arrangement to realize high resolution. An imaging signal obtained by imaging of the image sensor having the configuration of the special pixel arrangement is a signal in which the number of pixels of each color, an arrangement interval, or the like is different. The imaging signal has a problem in that a luminance component may not be detected for each color under the same conditions. Accordingly, a problem may arise in that an exact focus adjustment state may not be displayed when only the luminance level of the signal of each color output by the image sensor is detected.

For example, in an image sensor having the configuration of the Bayer arrangement, the number of green pixels is greater than the number of red or blue pixels. Therefore, when the luminance component of each color is detected under the same conditions, a relatively high luminance component is detected when a green object is imaged. On the other hand, when a red or blue object is imaged, the detection level of the luminance component may be lowered in spite of the fact that the focus state is the same as that of the imaged green object. Therefore, since the detection level of the luminance may vary depending on the color of a subject to be imaged, it is difficult to detect an exact focus state without dependency on the color. In the related art, to detect the exact focus state without dependency on the color, a large-scale and complicated circuit is necessary and a process consuming much power in the large-scale circuit has to be performed. Thus, the imaging apparatus according to the related art is undesirable.

Hitherto, the problem with the focus adjustment in the manual focus operation has been described. However, even when the focus state is detected in an imaging apparatus performing auto-focus adjustment, the same problem may arise when the exact detection is performed.

It is desirable to provide an imaging apparatus and an imaging method capable of simply and satisfactorily detecting a focus adjustment state from a signal obtained by imaging.

According to an embodiment of the present disclosure, luminance of each of first, second, and third colors within a focus determination region of an imaging signal obtained by imaging with an image sensor having pixels of the first, second, and third colors is integrated, and a ratio of the luminance between the integrated values of the colors is calculated. The integrated value of the luminance of the first color within the focus determination region obtained from the imaging signal is normalized at the ratio of the luminance between the calculated integrated values of the colors. A guide display corresponding to the normalized integrated value of the luminance of the first color is performed.

Thus, a variation state of the integrated value of the luminance of a specific color within the focus determination region is displayed on a screen such as a viewfinder. A just-focus state can be obtained by adjusting the focus so that the displayed integrated value is the highest. In this case, the integrated value of the luminance of the specific color is normalized at this ratio of the luminance between the integrated values of the colors and the normalized integrated value is used for the display. Therefore, regardless of the color of an imaged subject, stable display can be realized.

According to the embodiment of the present disclosure, since the focus adjustment state is displayed based on the value obtained by normalizing the integrated value of the luminance of the specific color at this ratio of the luminance between the integrated values of the colors, the stable focus adjustment state can be displayed without dependency on the color of the subject.

BRIEF DESCRIPTION OF THE DRAWINGS

FIGS. 2A and 2B are diagrams illustrating examples of the pixel arrangement of an image sensor of the imaging apparatus according to the embodiment of the present disclosure;

DETAILED DESCRIPTION OF THE EMBODIMENT

An embodiment of the present disclosure will be described in the following order.

1. Example of Configuration of Imaging Apparatus (FIG. 1)

2. Example of Pixel Arrangement of Image sensor (FIGS. 2A and 2B)
3. Example of Process and Display of Imaging Apparatus (FIGS. 3, 4A, and 4B)
4. Application Example of Auto-focus (FIG. 5)
5. Modification Examples 1. Example of Configuration of Imaging Apparatus The configuration of an imaging apparatus will be described with reference to FIG. 1 according to an embodiment (hereinafter referred to as the "present example") of the present disclosure.

Figure 1:
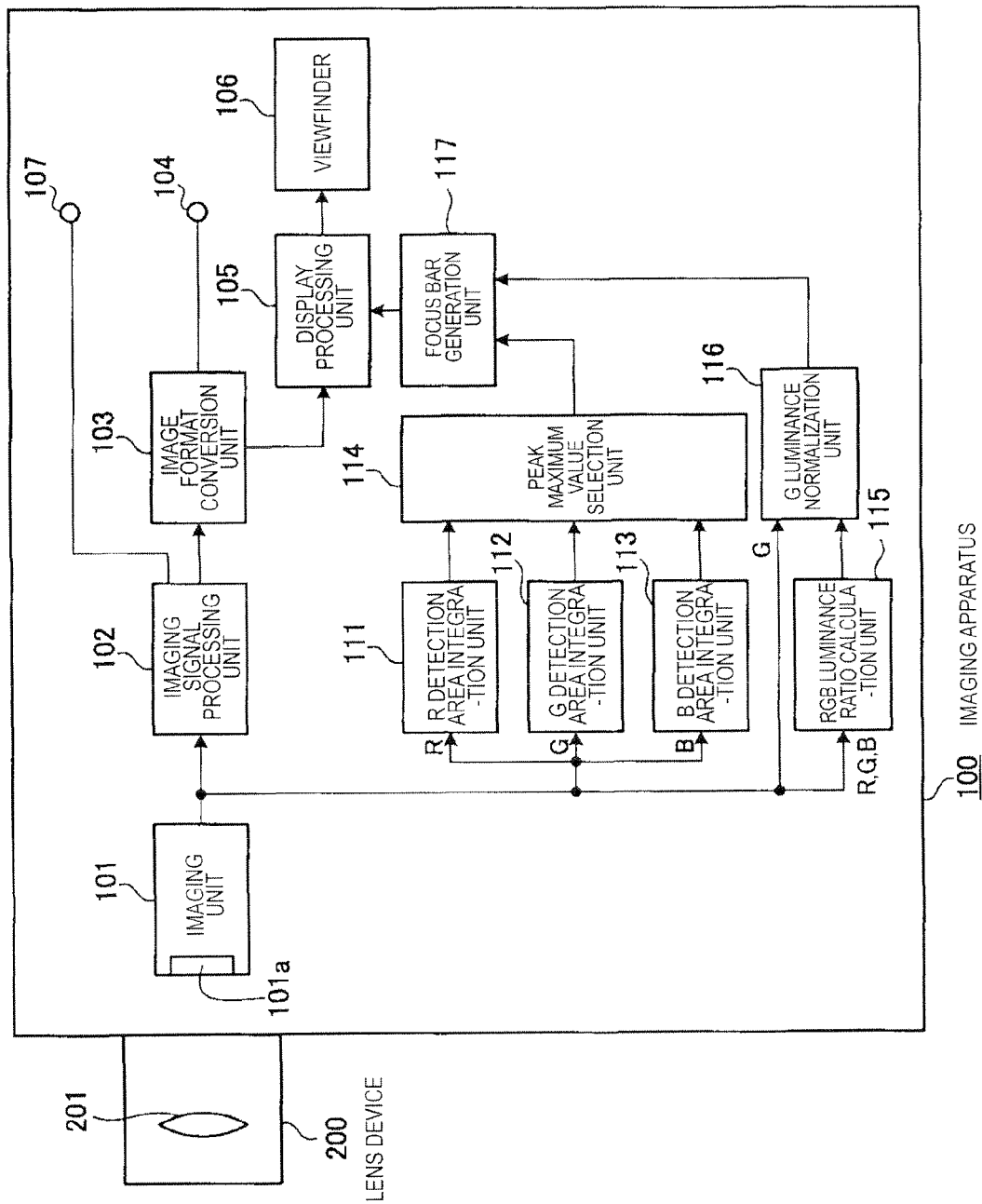
FIG. 1 is a diagram illustrating the configuration of an imaging apparatus according to an embodiment of the present disclosure.

FIG. 1 is a diagram illustrating the configuration of the imaging apparatus according to the present example.

An imaging apparatus 100 includes an imaging unit 101 that includes an image sensor 101a and a circuit reading an imaging signal from the image sensor 101a. A lens apparatus 200 including a lens 201 is mounted on the imaging apparatus 100. FIG. 1 shows the lens 201 configured by a single lens. In effect, the lens 201 is configured by a plurality (plural groups) of lenses. The lens apparatus 200 includes a focus ring used to adjust focus. When a photographer rotates the focus ring, the position of a focus adjusting lens is moved, so that the focus is adjusted.

The image sensor 101a of the imaging unit 101 converts image light incident on an imaging surface via the lens 201 into an electrical imaging signal.

The image sensor 101a is a single image sensor known as a single plate type image sensor. Red pixels, green pixels, and blue pixels are arranged on the imaging surface of the single image sensor 101a. Various types of image sensors such as a CCD image sensor or a CMOS image sensor are applicable as a type of image sensor 101a. An example of the pixel arrangement of the image sensor 101a will be described later.

The imaging signal obtained by the imaging unit 101 is supplied to an imaging signal processing unit 102. The imaging signal output by the imaging unit 101 is so-called raw data that is output as the imaging signal read from the image sensor 101a without conversion. Accordingly, the imaging signal output by the imaging unit 101 is a signal in which a red signal R obtained from a red pixel, a green signal G obtained from a green pixel, and a blue signal B obtained from a blue pixel are mixed so as to correspond to the pixel arrangement of the image sensor 101a.

When each signal processing system of the imaging apparatus is digitized, the digitized raw data may be output from the imaging unit 101 and may be supplied to the imaging signal processing unit 102.

The imaging signal processing unit 102 performs various kinds of processing on the supplied imaging signal to form a suitable imaging signal. For example, the imaging signal processing unit 102 performs processing such as gamma correction and white balance adjustment. Further, the imaging signal processed by the imaging signal processing unit 102 is supplied to an image format conversion unit 103 and is converted into image data with a predetermined format. Then, the image data converted by the image format conversion unit 103 is output from an image signal output terminal 104 to the outside. The imaging apparatus 100 further includes a raw data output terminal 107, so that the raw data supplied to the imaging signal processing unit 102 can be output from the raw data output terminal 107 to the outside without conversion.

The image format conversion unit 103 performs conversion to obtain image data to be displayed by a viewfinder 106 and supplies the converted image data to a display processing unit 105. The display processing unit 105 processes the supplied image data and displays the processed image data on the viewfinder 106. In this case, a focus bar signal generated by a focus bar generation unit 117 to be described below is supplied to the display processing unit 105 and a figure called a focus bar is displayed in a captured image being displayed on the viewfinder 106. A specific example of the focus bar will be described later.

The imaging signal (raw data) output by the imaging unit 101 is supplied to an R detection area integration unit 111, a G detection area integration unit 112, and a B detection area integration unit 113.

The R detection area integration unit 111 detects high-frequency luminance components of the red signal R of the imaging signal within a focus detection area and integrates the detected luminance values. The G detection area integration unit 112 detects high-frequency luminance components of the green signal G of the imaging signal within the focus detection area and integrates the detected luminance values. The B detection area integration unit 113 detects high-frequency luminance components of the blue signal B of the imaging signal within the focus detection area and integrates the detected luminance values. As will be described below, when the bands of the luminance components determined from the pixel arrangement of the image sensor 101a are varied in the respective colors, the bands of the luminance components are processed so as to have the same condition. Specifically, when the image sensor 101a has a standard Bayer arrangement shown in FIG. 2A to be described below, the green signal G detected by the G detection area integration unit 112 is processed to a signal thinned in each pixel so as to have the same band (pixel interval) as the other color signals R and B.

The luminance value integrations of the R detection area integration 111, the G detection area integration unit 112, and the B detection area integration unit 113 are, for example, performed on the signal within the focus detection area for each imaging signal of one frame imaged by the imaging unit 101.

The focus detection area is set by a control unit (not shown) of the imaging apparatus 100. For example, the vicinity of the middle portion of the imaging screen is set as the focus detection area and a focus state within the focus detection area is detected. A range of the focus detection area within the imaging screen may be set, for example, by a user operation.

The integrated values obtained by detection area integration units 111, 112, and 113 are supplied to a peak maximum value selection unit 114. Then, the peak maximum value selection unit 114 selects the integrated value of a color with the maximum value. Then, the integrated value of the color selected by the peak maximum value selection unit 114 is supplied to the focus bar generation unit 117.

The imaging signal output by the imaging unit 101 is supplied to an RGB luminance ratio calculation unit 115. The RGB luminance ratio calculation unit 115 compares the integrated value of the red signal R, the integrated value of the green signal G, and the integrated value of the blue signal B of the imaging signal within the focus detection area to each other, and calculates a ratio of the integrated values of these colors. For example, this ratio of the integrated values is calculated for each imaging signal of one frame imaged by the imaging unit 101. Data regarding the ratio calculated by the RGB luminance ratio calculation unit 115 is supplied to a G luminance normalization unit 116.

The green signal G of the imaging signal output by the imaging unit 101 is supplied to the G luminance normalization unit 116. The G luminance normalization unit 116 calculates the integrated value of the high-frequency of the green signal G within the focus detection area and normalizes the calculated integrated values based on the data regarding the ratio supplied from the RGB luminance ratio calculation unit 115. The calculation of the integrated values and the normalization process performed by the G luminance normalization unit 116 are also performed for each one frame.

Next, the normalization process based on the data regarding the ratio in the G luminance normalization unit 116 will be described. When the integrated value of the green signal G is the highest among the three colors based on the data regarding the ratio, the integrated value of the green signal G obtained by the G luminance normalization unit 116 is set as normalized data without change. When the integrated value of the red signal R is the highest among the three colors, the integrated value of the green signal G is normalized based on a ratio between the integrated value of the red signal R and the integrated value of the green signal G. For example, when the ratio of the integrated value of the red signal R to the integrated value of the green signal G is 2:1 and thus the red components are twice the green components, the normalization is performed so that the integrated value of the green signal G is doubled.

Likewise, when the integrated value of the blue signal B is the highest among the three colors, the integrated value of the green signal G is normalized based on a ratio between the integrated value of the blue signal B and the integrated value of the green signal G.

The integrated value of the green signal G normalized by the G luminance normalization unit 116 is supplied to the focus bar generation unit 117.

The focus bar generation unit 117 performs a display process of generating a display signal configured to display a bar graph representing the focus state of the captured image. That is, the focus bar generation unit 117 sets the length of the bar graph based on a value obtained by adding the integrated value of the color selected by the peak maximum value selection unit 114 to the integrated value of the green signal G normalized by the G luminance normalization unit 116. Then, the focus bar generation unit 117 generates a bar graph display signal configured to display the bar graph with the set length.

The bar graph display signal generated by the focus bar generation unit 117 is supplied to the display processing unit 105. The bar graph display signal is superimposed on the display signal of the captured image supplied to the viewfinder 106 to display the bar graph on the viewfinder 106.

2. Example of Pixel Arrangement of Image Sensor

FIGS. 2A and 2B are diagrams illustrating an example of the pixel arrangement of the image sensor 101a of the imaging unit 101. In FIG. 2A, R denotes a pixel obtaining the red signal R, G denotes a pixel obtaining the green signal G, and B denotes a pixel obtaining the blue signal B. In the pixel arrangements shown in FIGS. 2A and 2B, the lateral direction and the longitudinal direction in the drawings are a horizontal direction and a vertical direction, respectively.

FIG. 2A shows an example of a standard Bayer arrangement. In the standard Bayer arrangement, pixels obtaining the red signal R and pixels obtaining the green signal G are alternately arranged one by one in a given one horizontal line. Further, pixels obtaining the blue signal B and the pixels obtaining the green signal G are alternately arranged one by one in a horizontal line adjacent to the above horizontal line. The arrangement positions of the pixels obtaining the green signal G in the horizontal line in which the pixels obtaining the red signal R are present and the arrangement positions of the pixels obtaining the green signal G in the horizontal line in which the pixels obtaining the blue signal B are present are shifted by each pixel.

Accordingly, in the case of the image sensor having the standard Bayer arrangement shown in FIG. 2A, the minimum arrangement interval Pg of the pixels obtaining the green signal G is identical with the arrangement pitch between the pixels, when two horizontal lines adjacent to each other in the vertical direction are set as a unit. On the other hand, the minimum arrangement interval Pr of the pixels obtaining the red signal R and the minimum arrangement interval Pb of the pixels obtaining the blue signal B are a two-pixel pitch which is twice the green minimum arrangement interval Pg.

The bands of the high-frequency components of the color components included in the imaging signal (raw data) are determined by the minimum arrangement intervals Pr, Pg, and Pb in the horizontal direction of the pixels of the respective colors. Specifically, the green signal G is configured as a signal detected at a one-pixel pitch. The red signal R and the blue signal B are configured as signals detected at a two-pixel pitch. When these pixel pitches are directly reflected on the frequency band of the imaging signal without change, the green signal G has a frequency component which is twice as high as the other color signals R and B.

FIG. 2B shows an example of the pixel arrangement of the image sensor having a double Bayer arrangement in which the Bayer arrangement is modified. In the double Bayer arrangement, the arrangement positions of the pixels in each horizontal line are shifted by ½ pixel each.

The pixels obtaining the red signal R and the pixels obtaining the blue signal B are alternately arranged one by one in a given one horizontal line. Only the pixels obtaining the green signal G are arranged in a horizontal line adjacent to the horizontal line in which the red pixels and the blue pixels are arranged.

Even in the double Bayer arrangement, the green signal G is configured as the signal detected at a one-pixel pitch, and the red signal R and the blue signal B are configured as the signals detected at a two-pixel pitch, as in the standard Bayer arrangement.

For example, an image sensor having the standard Bayer arrangement shown in FIG. 2A is applied as the image sensor 101a of the imaging unit 101. Further, the pixel arrangements shown in FIGS. 2A and 2B are merely examples, and other pixel arrangements may be applied.

3. Example of Process and Display of Imaging Apparatus

Next, a processing example will be described in which the focus bar is displayed on the viewfinder 106 when the imaging apparatus 100 according to the present example performs imaging.

The bar graph shown by the display signal generated by the focus bar generation unit 117 is a graph that has a length corresponding to the value obtained by adding the integrated value of the color selected by the peak maximum value selection unit 114 to the integrated value of the green signal G normalized by the G luminance normalization unit 116.

The integrated value of the color selected by the peak maximum value selection unit 114 is the integrated value of a color for which the integrated value of luminance values obtained from the imaging signal is the highest. Accordingly, a value obtained by integrating the signal of the dominant color in the imaging signal obtained by imaging a subject becomes one component of the length of the bar graph.

The integrated value of the green signal G normalized by the G luminance normalization unit 116, which is another component of the length of the bar graph, is used to display the bar graph, since the green signal G is a signal that has the highest frequency component. That is, as described with regard to the Bayer arrangement shown in FIG. 2A, the green signal G has the frequency component which is twice as high as the other color signals R and B due to the minimum arrangement intervals Pr, Pg, and Pb in the horizontal direction. When the focus bar representing the focus state shows the amount of a high-frequency component of the imaging signal, the current focus adjustment state can be guided with high accuracy.

The amount of a high-frequency component is shown using the integrated value of the green signal G including the highest frequency component. However, a case in which the green signal G included in the imaging signal is small may be considered, depending on an imaged subject. For example, in the imaging signal obtained when a red subject is imaged, the green signal G is detected as a signal which is relatively low in level and the red signal R is detected as a signal which is relatively high in level. However, in effect, regardless of the color of a subject that is imaged, it is rare for only a specific color component to be detected, and three-color components are detected as components with corresponding levels.

Figure 3:
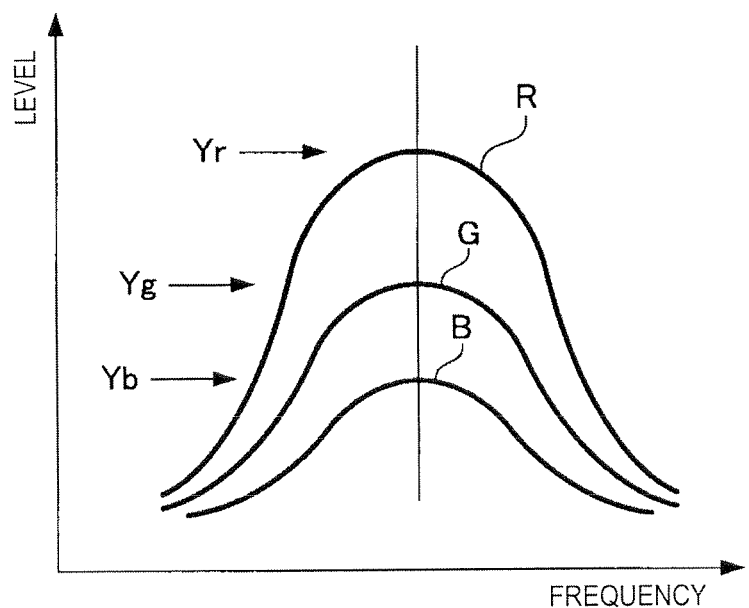
FIG. 3 is a diagram illustrating examples of the luminance levels of color components according to the embodiment of the present disclosure.

FIG. 3 shows an example of the levels of the frequencies of the color signals R, G, and B when a subject in which red components are abundant is imaged. A peak luminance value Yr of the red signal R is higher than a peak luminance value Yg of the green signal G and a peak luminance value Yb of the blue signal B.

Accordingly, when the subject in which red components are abundant is imaged, the integrated value of the green signal G is normalized at a ratio between the red signal and the green signal through the normalization of the G luminance normalization unit 116, and thus it is possible to obtain the integrated value of the read signal when the red signal is detected up to the high-frequency component. Thus, even when a subject of a given color is imaged with one component of the length of the bar graph, the high-frequency component obtained when the color component is detected at the one-pixel pitch is shown.

Figure 4:
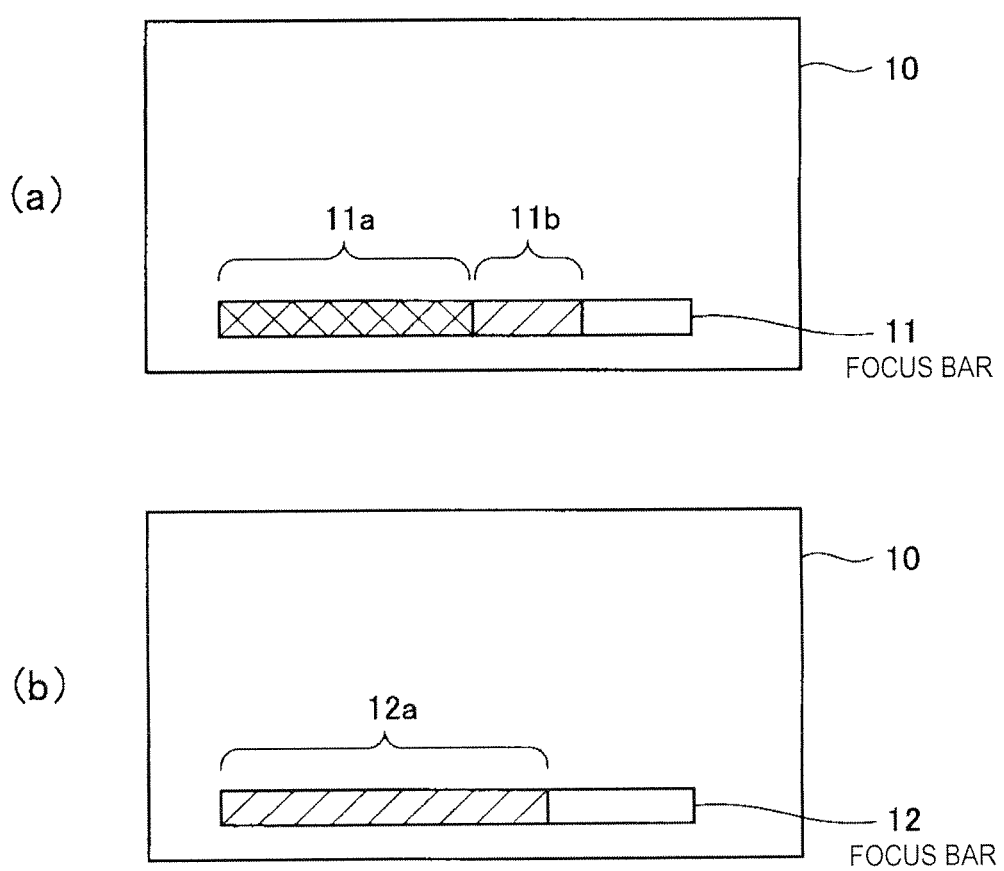
FIGS. 4A and 4B are diagrams illustrating examples of display screens according to the embodiment of the present disclosure.

FIGS. 4A and 4B are diagrams illustrating display examples of the bar graph.

As shown in FIG. 4A, a focus bar 11 with a given length is displayed with a relatively inconspicuous color such as white in the lower portion of a screen 10. Within the focus bar 11, a first element display 11a and a second element display 11b are shown with a relatively conspicuous color such as green or black. The first element display 11a is the display that corresponds to the integrated value of a color selected by the peak maximum value selection unit 114. The second element display 11b is the display that corresponds to the integrated value of the green signal G normalized by the G luminance normalization unit 116. The lengths of the element displays 11a and 11b are changed with a variation in the corresponding integrated values, respectively.

In FIG. 4A, the first element display 11a and the second element display 11b are indicated by different oblique lines so as to be distinguished from each other, but may not be distinguished from each other on an actual screen. That is, the length of the bar graph to which the first element display 11a and the second element display 11b are added is configured to be understood on the screen displayed on the viewfinder 106. As the length of the bar graph to which the first element display 11a and the second element display 11b are added is longer, the high-frequency component within the focus detection area of the captured image increases, and thus the state close to a just-focus state is shown.

The photographer who operates a focus adjusts the length of the bar graph, to which the first element display 11a and the second element display 11b are added, to make the length of the bar graph largest by operating the focus ring of the lens apparatus 200 while confirming the display on the viewfinder 106.

On the actual screen, the second element display 11b is an element corresponding to the highest frequency component and the level thereof is varied relatively quickly in response to the operation of the focus ring. On the other hand, the first element display 11a is an element corresponding to the detection of the frequency component of the intermediate band lower than the second element display 11b and the level thereof is varied slowly compared to the second element display 11b. Accordingly, a focused state is shown to some degree by the first element display 11a and an exact focused state is shown by the second element display 11b. Therefore, a satisfactory display form is realized by adding and displaying the elements.

As a mode of displaying the focus bar, a mode of displaying only one of the first element display 11a and the second element display 11b may be prepared. As shown in FIG. 4B, for example, a focus bar 12 displaying an element display 12a corresponding to the integrated value of the green signal G normalized by the G luminance normalization unit 116 may be displayed on the viewfinder 106.

Further, a bar graph having only an element corresponding to the integrated value of the color selected by the peak maximum value selection unit 114 may be displayed.

For example, the display mode is selected through a process of the focus bar generation unit 117 which is a unit that processes the display of the focus bar.

As described above, a guide display configured to assist a focus operation can be realized simply and satisfactorily by displaying the focus bar varied in accordance with the integrated value of the luminance on the viewfinder 106 of the imaging apparatus 100. The process of displaying the focus bar can be realized relatively simply by detecting and integrating the respective color components and performing the normalization based on the peak selection or the ratio, as shown in FIG. 1.

4. Application Example of Auto-Focus

In the above-described embodiment, the process of detecting the focus state and displaying this focus state has been applied. Further, a focus lens of the lens apparatus mounted on the imaging apparatus may be driven based on the detected focus state and auto-focus adjustment may be performed.

Figure 5:
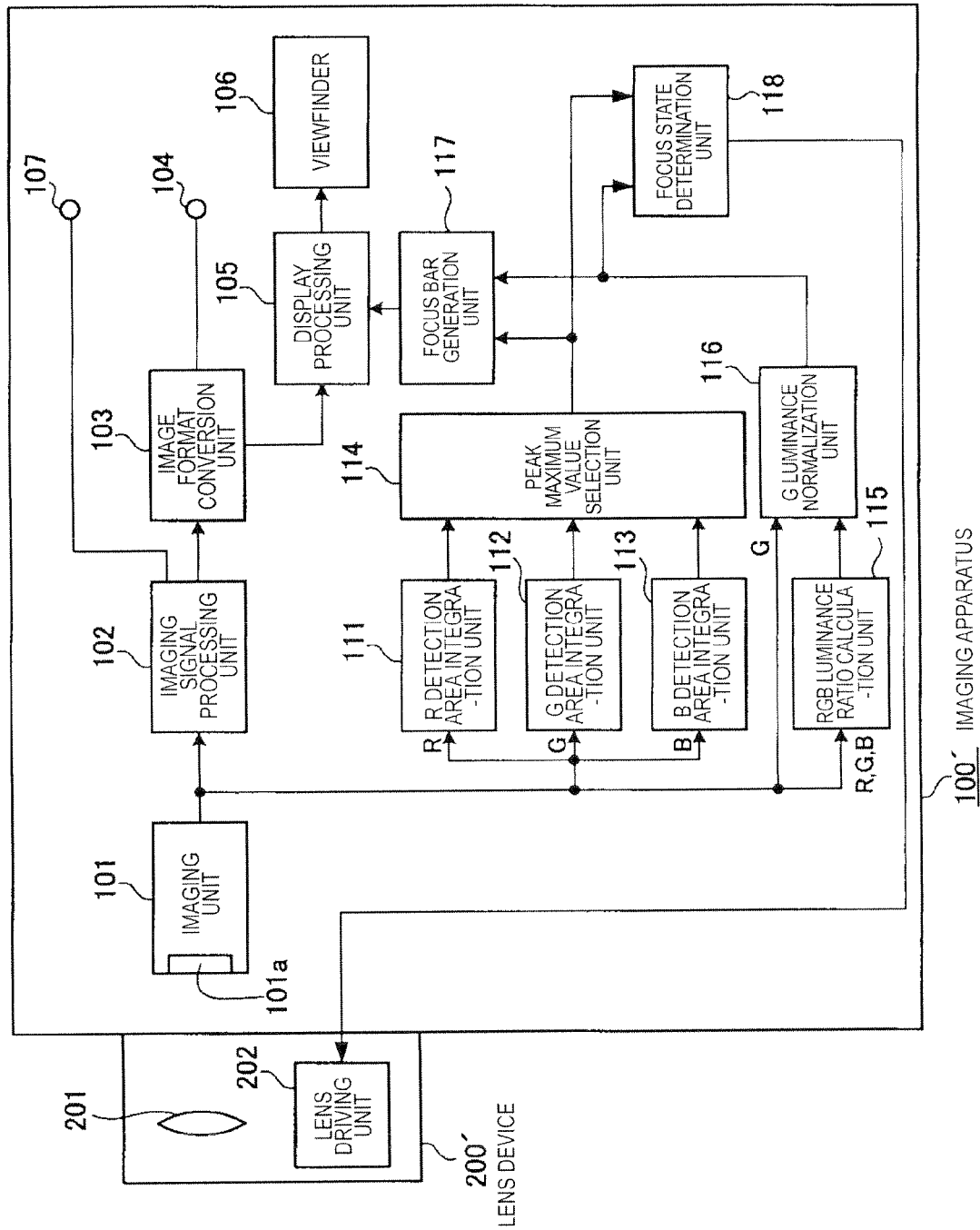
FIG. 5 is a diagram illustrating the configuration of an imaging apparatus according to another embodiment (an embodiment in which auto-focus adjustment is performed) of the present disclosure.

FIG. 5 is a diagram illustrating an example of the configuration of an imaging apparatus 100' performing auto-focus adjustment.

As in the imaging apparatus 100 described in FIG. 1, the imaging apparatus 100' includes an R detection area integration unit 111, a G detection area integration unit 112, a B detection area integration unit 113, and a peak maximum value selection unit 114. The peak maximum value selection unit 114 obtains the integrated value of a color with the highest value. The imaging apparatus 100' further includes an RGB luminance ratio calculation unit 115 and a G luminance normalization unit 116 to obtain the integrated value of a normalized green signal G.

The integrated value selected by the peak maximum value selection unit 114 and the integrated value normalized by the G luminance normalization unit 116 are supplied to a focus bar generation unit 117 and are supplied to a focus state determination unit 118.

The imaging apparatus 100' is different from the imaging apparatus 100 described in FIG. 1 in that the imaging apparatus 100' includes the focus state determination unit 118. The focus state determination unit 118 is a focus processing unit that controls auto-focus adjustment based on the determination result of the focus state. That is, the focus state determination unit 118 transmits an instruction to a lens driving unit 202 of a lens apparatus 200' mounted on the imaging apparatus 100' to drive the focus lens in lenses 201 and performs the auto-focus adjustment.

To perform the auto-focus adjustment, the focus state determination unit 118 determines an additive value obtained by adding the integrated value selected by the peak maximum value selection unit 114 and the integrated value normalized by the G luminance normalization unit 116. Then, the focus lens is driven so that the additive value is the maximum.

The other configurations of the imaging apparatus 100' shown in FIG. 5 are the same as those of the imaging apparatus 100 shown in FIG. 1.

In the example of FIG. 5, both the focus bar display on the viewfinder 106 and the auto-focus control performed to control the focus lens are performed by the focus bar generation unit 117 and the focus state determination unit 118. Further, the imaging apparatus may be configured so that the focus bar generation unit 117 is not provided and only the auto-focus control is performed.

Even when the focus state determination unit 118 determines the focus state, only one of the integrated value selected by the peak maximum value selection unit 114 and the integrated value normalized by the G luminance normalization unit 116 may be used for the auto-focus control.

5. Modification Examples

In the imaging apparatuses shown in FIGS. 1 and 5, dedicated circuit blocks perform the processes, such as the integration of the detected signals of the respective colors and the calculation of the ratio, on the imaging signal. On the other hand, for example, a calculation processing unit calculating the imaging signal may be provided to perform the process of obtaining the integrated value of the color with the highest value in the calculation processing unit and the process of obtaining the integrated value of the normalized green signal G. These processes can be realized by installing software (a program) executing the same processes as the configuration shown in FIG. 1 on the calculation processing unit.

In the above-described embodiment, the example in which the image sensor 101a has the pixels obtaining the red signal, the pixels obtaining the green signal, and the pixels obtaining the blue signal in the Bayer arrangement has been described. Further, the focus state detection process described in the embodiment may be applied to an imaging apparatus that includes different image sensors having the pixels of each color, that is, so-called three plate type image sensors.

The pixel arrangement of the image sensor 101a shown in FIG. 2 is merely an example, and other pixel arrangements may be applied.

The example in which the pixels of signals of red, green, and blue which are the three primary colors of the additive color mixture are arranged in the image sensor 101a has been described. This example is also applicable to an image sensor in which the pixels of the three primary colors of the subtractive color mixture are arranged. Even in the case of the three primary colors of the subtractive color mixture, the same process can be performed by normalizing the signal of a color with the narrowest pixel arrangement pitch at the ratio to another color.

In the above-described embodiment, the example in which the guide display is performed by the bar graph has been described. However, for example, the additive value obtained by adding the integrated value selected by the peak maximum value selection unit 114 and the integrated value normalized by the G luminance normalization unit 116 may be displayed in another form such as numerical value display.

The embodiments of the present technology may be realized as follows.

(1) An imaging apparatus includes: an imaging unit that performs imaging with an image sensor having pixels of first, second, and third colors; a luminance ratio calculation unit that integrates luminance of each of the first, second, and third colors within a focus determination region of an imaging signal output by the imaging unit and calculates a ratio of the luminance between the integrated values of the colors; a luminance normalization unit that normalizes the integrated value of the luminance of the first color within the focus determination region of the imaging signal output by the imaging unit at the ratio of the luminance between the integrated values calculated by the luminance ratio calculation unit; and a display processing unit that performs display corresponding to the integrated value of the luminance normalized by the luminance normalization unit.

(2) The imaging apparatus described in (1) further includes: a color integration unit that integrates the luminance of each of the first, second, and third colors of the imaging signal output by the imaging unit; and a maximum value selection unit that selects the highest integrated value among the integrated values obtained by the color integration unit. When the integrated value selected by the maximum value selection unit is supplied to the display processing unit, the display processing unit performs guide display corresponding to the normalized integrated value of the luminance and the selected integrated value of the luminance.

(3) In the imaging apparatus described in (1) or (2), the display processing unit performs a process of displaying, on a screen, a graph with a length corresponding to an additive value obtained by adding the normalized integrated value of the luminance and the selected integrated value of the luminance.

(4) In the imaging apparatus described in any one of (1) to (3), the image sensor is a sensor in which the number of pixels in a horizontal direction of the pixels of the first color is different from the number of pixels in a horizontal direction of the pixels of the second and third colors.

(5) In the imaging apparatus described in any one of (1) to (4), the image sensor is a sensor in which red, green, and blue pixels are arranged in a Bayer arrangement or a modified Bayer arrangement. The integrated value of the luminance of the first color normalized by the luminance normalization unit is an integrated value of the luminance of the green.

(6) The imaging apparatus described in any one of (1) to (5) further includes a focus processing unit that drives a focus lens disposed in an optical path of image light incident on the image sensor based on the integrated value of the luminance of the first color obtained by the luminance normalization unit.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2011-111433 filed in the Japan Patent Office on May 18, 2011, the entire content of which is hereby incorporated by reference.

What is claimed is:

1. An imaging apparatus comprising:
   an imaging unit that performs imaging with an image sensor having pixels of first, second, and third colors and produces color signals, each of a respective luminance;
   a color integration unit that integrates a luminance value of each of the first, second, and third colors within a focus determination region of an imaging signal output by the imaging unit;
   a luminance ratio calculation unit that calculates a ratio of the integrated luminance values of the colors to each other;
   a luminance normalization unit that normalizes the integrated value of the luminance of the first color within the focus determination region of the imaging signal based on the calculated ratio of the integrated luminance values;
   a maximum value selection unit that selects a highest integrated luminance value among the integrated luminance values obtained by the color integration unit; and
   a display processing unit that performs display processing corresponding to the normalized integrated luminance value of the first color;
   wherein, when the integrated luminance value selected by the maximum value selection unit is supplied to the display processing unit, the display processing unit performs a guide display process corresponding to the normalized integrated luminance value of the first color and the selected integrated luminance value.

2. The imaging apparatus according to claim 1, wherein the display processing unit performs a process of displaying, on a screen, a graph with a length corresponding to a value obtained by adding the normalized integrated luminance value and the selected integrated luminance value.

3. The imaging apparatus according to claim 1, wherein the image sensor is a sensor in which the number of pixels in a horizontal direction of the pixels of the first color is different from the number of pixels in a horizontal direction of the pixels of the second and third colors.

4. The imaging apparatus according to claim 3,
   wherein the image sensor is a sensor in which red, green, and blue pixels are arranged in a Bayer arrangement or a modified Bayer arrangement, and
   the integrated value of the luminance of the first color normalized by the luminance normalization unit is an integrated value of the luminance of the green pixels.

5. The imaging apparatus according to claim 1, further comprising:
   a focus processing unit that drives a focus lens disposed in an optical path of image light incident on the image sensor based on the normalized integrated value of the luminance of the first color.

6. An imaging method comprising:
   obtaining first, second and third color signals of an imaging signal, each of a respective luminance value;
   integrating the luminance value of each of the first, second, and third color signals within a focus determination region of the imaging signal and calculating a ratio of the integrated luminance values of the colors to each other;
   normalizing the integrated value of the luminance of the first color within the focus determination region obtained from the imaging signal based on the calculated ratio of the integrated luminance values of the colors;
   selecting a highest integrated luminance value among the integrated luminance values; and
   performing a guide display process corresponding to the normalized integrated value of the luminance of the first color and the highest integrated luminance value.

* * * * *